(No Model.)
K. A. BRIGHAM.
TWO WHEELED VEHICLE.
No. 380,744. Patented Apr. 10, 1888.
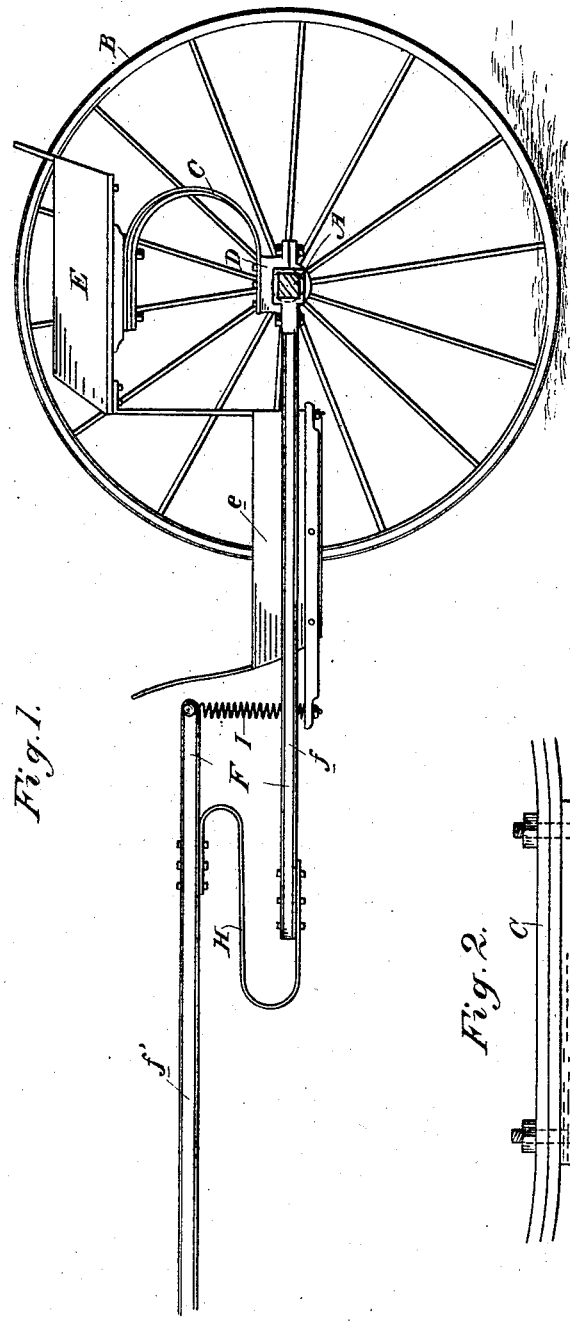
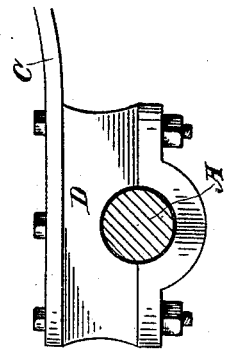
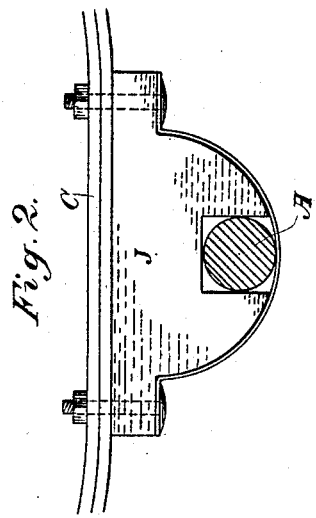
Witnesses,
Inventor,
K. A. Brigham
By Dewey & Co.
Atty

UNITED STATES PATENT OFFICE.

KASSON A. BRIGHAM, OF GILROY, CALIFORNIA.

TWO-WHEELED VEHICLE.

SPECIFICATION forming part of Letters Patent No. 380,744, dated April 10, 1888.

Application filed January 10, 1888. Serial No. 260,367. (No model.)

*To all whom it may concern:*

Be it known that I, KASSON A. BRIGHAM, of Gilroy, Santa Clara county, State of California, have invented an Improvement in Two-Wheeled Vehicles; and I hereby declare the following to be a full, clear, and exact description of the same.

My invention relates to that class of two-wheeled vehicles commonly known as "carts;" and my invention consists in the combination of an independently-movable body, a peculiarly-divided or sectional shaft, and a novel connection between the body and one of the sections of the shaft, all as I shall hereinafter fully describe.

The main object of my invention is to overcome the unpleasant motion which the rider experiences, and which is due to the motion of the horse. In vehicles of this class the primitive form provides for the rigid attachment of all the parts, so as to give stability to the vehicle, for it will be readily seen that if the body were connected with the axle by any other than a rigid connection and without any limit to its motion it would not remain upright; and, again, if the shafts were connected with the axle by the ordinary thill-coupling of a four-wheeled vehicle, there would be nothing to prevent the axle from turning; but in the improved vehicles it has been the endeavor to overcome the disadvantages of this type of conveyance by allowing the body to have an independence of motion and limiting it suitably, and also by connecting the shafts by a pivoted joint and limiting their movement in a proper manner, this latter movement taking also the form of a divided or sectional shaft, the joint being a yielding though limited one.

The particular object of my invention is to provide for the independence of the body and the jointing of the shaft, and by a novel connection between the two produce the perfect result of overcoming the motion due to the jogging of the horse.

Referring to the accompanying drawings, Figure 1 is a side elevation of my vehicle. Fig. 2 is a detailed view showing a modification of the connection between the body-supporting springs and the axle. Fig. 3 is a view showing the spring-box D pivoted on the axle.

A is the axle of the vehicle, upon which the wheel B is mounted in the usual manner.

C is the body-supporting spring, it being understood that the usual parts, although not here shown, are duplicated on the other side. These springs may be of the ordinary elliptic type, or, as here shown, may be the common C-springs.

D is a box which is pivoted to the axle, and to which the spring C is suitably clipped, so that the said spring can move about the axle freely as a center.

E is the body, which is supported upon the springs, $e$ being the foot portion of the body.

F is the shaft as a whole, said shaft being divided into the rear section, $f$, and the forward section, $f'$, the two sections being here shown in the same vertical plane, the forward section above the rear section and extending with its rear end beyond the forward end of said rear section. The rear end of the rear portion of the shaft is solidly clipped to the axle, while its forward end is connected with the forward section at a point forward of the rear end of said section by the spring H.

I is the connection between the forward end of the foot portion $e$ of the body and the rear end of the forward section, $f'$, of the shaft, the connection being preferably that of a spring and at a point back of the connection of the spring H which joins the two sections. The effect of this construction may be described as follows: As the horse rises, the forward section of the shaft moves up with him, and, through the connecting-spring H, has a tendency to raise the rear section, and thereby turn the axle and impart a slight oscillating movement to the body. This tendency is, however, corrected partly by reason of the sectional character of the shaft, but fully and particularly by the connection between the independently-moving body and the overlapping rear end of the forward shaft-section, which said section turns slightly on its connecting-spring H as a fulcrum, thereby slightly depressing its overlapping rear end and allowing the body to remain in position while the whole shaft is rising. In this way the rider is enabled to counteract the oscillating tendency which the body would otherwise have. It is obvious that the two sections of the shaft may have their overlapping ends side by side instead of one above the other, for the action of the forward section back of its fulcrum connection would be the same.

Instead of pivoting the body-supporting spring freely and loosely to the axle, I may modify the connection at that point by forming a more limited joint than the box D forms. This modification I have shown in Fig. 2, and it consists of an elastic bearing, J, formed of rubber or other suitable yielding material. This bearing is properly secured to the axle, and the spring is suitably bolted or clipped to its top. It is sufficiently yielding to allow all the necessary freedom to the body to accomplish the object heretofore explained. The spring I may be of any suitable character and material.

I am aware that in this class of vehicles it is not a new thing to connect the body or the body-supporting springs with the axle by a pivot or yielding joint, and I also know that sectional shafts the sections of which are united by springs are also old of themselves; and I do not, therefore, claim these features, separately or broadly, as my invention, but confine myself to the combination of these features with the connection between the body and the overlapping rear end of the forward shaft-section.

Having thus described my invention, what I claim as new, and desire to secure by Letters Patent, is—

1. In a two-wheeled vehicle, an independently-moving body, in combination with sectional or divided shafts, the rear sections being clipped solidly to the axle and the adjacent ends of the two sections overlapping, a connection between the sections forward of the rear ends of the forward sections and on which said sections fulcrum, and a connection between the body and the overlapping rear ends of the forward sections at a point back of their fulcrum-connection, substantially as herein described.

2. In a two-wheeled vehicle, an independently-moving body, in combination with sectional or divided shafts, the rear sections being clipped solidly to the axle and the adjacent ends of the two sections overlapping, a connection between the sections forward of the rear ends of the forward sections and on which said sections fulcrum, and springs connecting the body with the overlapping rear ends of the forward sections, substantially as herein described.

3. In a two-wheeled vehicle, an independently-moving body, in combination with sectional or divided shafts clipped to the axle and the forward sections lying above and overlapping the forward ends of the rear sections, springs connecting the sections at a point in front of the rear ends of the forward sections, and a connection between the body and the overlapping rear ends of the forward shaft-sections, substantially as described.

4. In a two-wheeled vehicle, an independently-moving body, in combination with the sectional shafts clipped at their rear ends solidly to the axle and having their forward sections above and overlapping the rear sections, a spring connecting the forward end of the rear sections with the upper sections at a point forward of their rear ends, and a spring-connection between the forward part of the body and the overlapping rear ends of the upper sections, substantially as described.

5. In a two-wheeled vehicle, a wheeled axle, a body, and intervening body-supporting springs pivoted to the axle, in combination with sectional or divided shafts clipped solidly to the axle and having the forward sections overlapping their rear sections, a spring connecting the sections, and springs connecting the body with the overlapping rear ends of the forward sections at a point behind the connection of the section-uniting springs, substantially as herein described.

6. In a two-wheeled vehicle, the wheeled axle, the body, the springs supporting the body, and the elastic bearing by which the springs are connected with the axle, in combination with the sectional shafts clipped rigidly to the axle, the sections of said shafts overlapping and connected by springs, and the springs connecting the forward portion of the body with the projecting rear end of the forward sections of the shafts, substantially as herein described.

In witness whereof I have hereunto set my hand.

KASSON A. BRIGHAM.

Witnesses:
   E. L. PARRAMORE,
   B. E. HOLLAWAY.